US009283593B2

(12) United States Patent
Bruck et al.

(10) Patent No.: US 9,283,593 B2
(45) Date of Patent: Mar. 15, 2016

(54) SELECTIVE LASER MELTING / SINTERING USING POWDERED FLUX

(71) Applicants: Gerald J. Bruck, Oviedo, FL (US); Ahmed Kamel, Orlando, FL (US)

(72) Inventors: Gerald J. Bruck, Oviedo, FL (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 493 days.

(21) Appl. No.: 13/755,098

(22) Filed: Jan. 31, 2013

(65) Prior Publication Data

US 2013/0136868 A1     May 30, 2013

Related U.S. Application Data

(63) Continuation of application No. 13/005,656, filed on Jan. 13, 2011.

(51) Int. Cl.

| | |
|---|---|
| *B22F 3/105* | (2006.01) |
| *B05D 3/06* | (2006.01) |
| *B23K 9/04* | (2006.01) |
| *B23K 10/02* | (2006.01) |
| *B23K 15/00* | (2006.01) |
| *B23K 26/14* | (2014.01) |
| *B23K 26/34* | (2014.01) |

(Continued)

(52) U.S. Cl.
CPC ................ *B05D 3/06* (2013.01); *B22F 3/1055* (2013.01); *B23K 9/042* (2013.01); *B23K 9/044* (2013.01); *B23K 10/027* (2013.01); *B23K 15/0093* (2013.01); *B23K 26/1411* (2013.01); *B23K 26/3206* (2013.01); *B23K 26/3293* (2013.01); *B23K 26/34* (2013.01); *B23K 26/345* (2013.01); *C23C 24/10* (2013.01); *C23C 26/02* (2013.01); *B22F 5/04* (2013.01); *B23K 2201/001* (2013.01); *B23K 2203/06* (2013.01); *F01D 5/005* (2013.01)

(58) Field of Classification Search
CPC .......... B23K 2203/06; B23K 26/3293; B23K 26/3206; B23K 26/34; B23K 26/345; B23K 26/1411; B23K 15/0093; B23K 9/044; B23K 9/042; B23K 2201/001; B22F 3/1055; C23C 26/02; C23C 24/10; B05D 3/06
See application file for complete search history.

(56) References Cited

U.S. PATENT DOCUMENTS

| 3,448,241 A | 6/1969 | Buckingham |
|---|---|---|
| 3,627,979 A | 12/1971 | Quaas |

(Continued)

FOREIGN PATENT DOCUMENTS

| EP | 0764487 A1 | 3/1997 |
|---|---|---|
| EP | 2055424 A2 | 5/2009 |

(Continued)

OTHER PUBLICATIONS

Machine translation of Russian Patent document No. 2,217,266, Jun. 2015.*

(Continued)

*Primary Examiner* — Geoffrey S Evans (57) ABSTRACT

An additive manufacturing process (110) wherein a powder (116) including a superalloy material and flux is selectively melted in layers with a laser beam (124) to form a superalloy component (126). The flux performs a cleaning function to react with contaminants to float them to the surface of the melt to form a slag. The flux also provides a shielding function, thereby eliminating the need for an inert cover gas. The powder may be a mixture of alloy and flux particles, or it may be formed of composite alloy/flux particles.

15 Claims, 4 Drawing Sheets

(51) Int. Cl.
*C23C 24/10* (2006.01)
*C23C 26/02* (2006.01)
*B23K 26/32* (2014.01)
B22F 5/04 (2006.01)
F01D 5/00 (2006.01)

(56) References Cited

U.S. PATENT DOCUMENTS

| | | |
|---|---|---|
| 4,331,857 A | 5/1982 | Crisci |
| 4,741,974 A | 5/1988 | Longo |
| 6,539,620 B1 | 4/2003 | Smashey |
| 6,750,430 B2 | 6/2004 | Kelly |
| 6,916,387 B2 | 7/2005 | Lulofs |
| 7,169,242 B2 | 1/2007 | Fernihough |
| 7,653,995 B2 | 2/2010 | Morin |
| 8,324,526 B2 | 12/2012 | Grüger et al. |
| 2004/0099714 A1* | 5/2004 | Strusinski et al. ............ 228/232 |
| 2006/0054079 A1* | 3/2006 | Withey et al. ................ 117/108 |
| 2007/0037509 A1 | 2/2007 | Renz et al. |
| 2009/0026183 A1* | 1/2009 | Rose ........................ 219/121.65 |
| 2012/0100030 A1* | 4/2012 | Green ............................... 419/6 |
| 2012/0181255 A1 | 7/2012 | Bruck |

FOREIGN PATENT DOCUMENTS

| | | |
|---|---|---|
| KR | 2003-0046262 A * | 6/2003 |
| RU | 2217266 C2 | 11/2003 |
| WO | 9210343 A1 | 6/1992 |

OTHER PUBLICATIONS

G. J. Bruck, A Study of Fluxing Agents in High Power Laser Beam Cladding, , Mar. 7, 1989, Westinghouse R&D Center, Pittsburgh, Pennsylvania.

Konrad Wissenbach, Presentation of EC Project FANTASIA, Mar. 31, 2011, Fraunhofer Institute for Laser Technology, Aachen, Germany.

* cited by examiner

SELECTIVE LASER MELTING / SINTERING USING POWDERED FLUX

This application is a continuation-in-part of pending U.S. patent application Ser. No. 13/005,656 filed on 13 Jan. 2011 (publication number US 2012/0181255 A1), incorporated by reference herein.

FIELD OF THE INVENTION

This invention relates generally to the field of metals joining, and more particularly to an additive manufacturing process for superalloy materials.

BACKGROUND OF THE INVENTION

Welding processes vary considerably depending upon the type of material being welded. Some materials are more easily welded under a variety of conditions, while other materials require special processes in order to achieve a structurally sound joint without degrading the surrounding substrate material.

Common arc welding generally utilizes a consumable electrode as the feed material. In order to provide protection from the atmosphere for the molten material in the weld pool, an inert cover gas or a flux material may be used when welding many alloys including, e.g. steels, stainless steels, and nickel based alloys. Inert and combined inert and active gas processes include gas tungsten arc welding (GTAW) (also known as tungsten inert gas (TIG)) and gas metal arc welding (GMAW) (also known as metal inert gas (MIG) and metal active gas (MAG)). Flux protected processes include submerged arc welding (SAW) where flux is commonly fed, flux cored arc welding (FCAW) where the flux is included in the core of the electrode, and shielded metal arc welding (SMAW) where the flux is coated on the outside of the filler electrode.

The use of energy beams as a heat source for welding is also known. For example, laser energy has been used to melt pre-placed stainless steel powder onto a carbon steel substrate with powdered flux material providing shielding of the melt pool. The flux powder may be mixed with the stainless steel powder or applied as a separate covering layer. To the knowledge of the inventors, flux materials have not been used when welding superalloy materials.

It is recognized that superalloy materials are among the most difficult materials to weld due to their susceptibility to weld solidification cracking and strain age cracking. The term "superalloy" is used herein as it is commonly used in the art; i.e., a highly corrosion and oxidation resistant alloy that exhibits excellent mechanical strength and resistance to creep at high temperatures. Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Weld repair of some superalloy materials has been accomplished successfully by preheating the material to a very high temperature (for example to above 1600° F. or 870° C.) in order to significantly increase the ductility of the material during the repair. This technique is referred to as hot box welding or superalloy welding at elevated temperature (SWET) weld repair, and it is commonly accomplished using a manual GTAW process. However, hot box welding is limited by the difficulty of maintaining a uniform component process surface temperature and the difficulty of maintaining complete inert gas shielding, as well as by physical difficulties imposed on the operator working in the proximity of a component at such extreme temperatures.

Some superalloy material welding applications can be performed using a chill plate to limit the heating of the substrate material; thereby limiting the occurrence of substrate heat affects and stresses causing cracking problems. However, this technique is not practical for many repair applications where the geometry of the parts does not facilitate the use of a chill plate.

Figure 6:
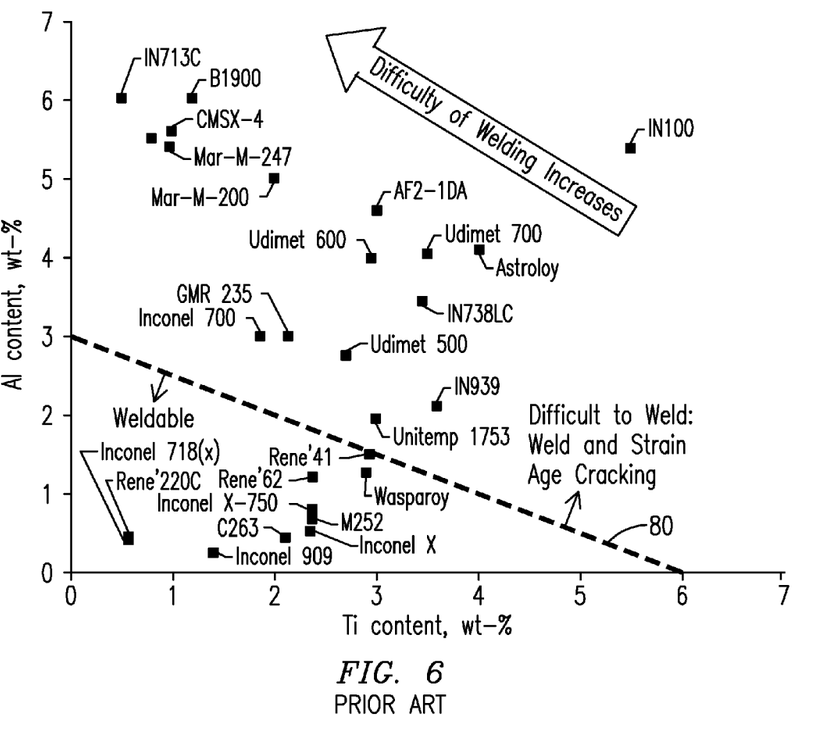
FIG. 6 is a prior art chart illustrating the relative weldability of various superalloys.

FIG. 6 is a conventional chart illustrating the relative weldability of various alloys as a function of their aluminum and titanium content. Alloys such as Inconel® IN718 which have relatively lower concentrations of these elements, and consequentially relatively lower gamma prime content, are considered relatively weldable, although such welding is generally limited to low stress regions of a component. Alloys such as Inconel® IN939 which have relatively higher concentrations of these elements are generally not considered to be weldable, or can be welded only with the special procedures discussed above which increase the temperature/ductility of the material and which minimize the heat input of the process. A dashed line 80 indicates a recognized upper boundary of a zone of weldability. The line 80 intersects 3 wt. % aluminum on the vertical axis and 6 wt. % titanium on the horizontal axis. Alloys outside the zone of weldability are recognized as being very difficult or impossible to weld with known processes, and the alloys with the highest aluminum content are generally found to be the most difficult to weld, as indicated by the arrow.

It is also known to utilize selective laser melting (SLM) or selective laser sintering (SLS) to melt a thin layer of superalloy powder particles onto a superalloy substrate. The melt pool is shielded from the atmosphere by applying an inert gas, such as argon, during the laser heating. These processes tend to trap the oxides (e.g. aluminum and chromium oxides) that are adherent on the surface of the particles within the layer of deposited material, resulting in porosity, inclusions and other defects associated with the trapped oxides. Post process hot isostatic pressing (HIP) is often used to collapse these voids, inclusions and cracks in order to improve the properties of the deposited coating. The application of these processes is also limited to horizontal surfaces due to the requirement of pre-placing the powder.

Laser microcladding is a 3D-capable process that deposits a small, thin layer of material onto a surface by using a laser beam to melt a flow of powder directed toward the surface. The powder is propelled toward the surface by a jet of gas, and when the powder is a steel or alloy material, the gas is argon or other inert gas which shields the molten alloy from atmospheric oxygen. Laser microcladding is limited by its low deposition rate, such as on the order of 1 to 6 $cm^3$/hr. Furthermore, because the protective argon shield tends to dissipate before the clad material is fully cooled, superficial oxidation and nitridation may occur on the surface of the deposit, which is problematic when multiple layers of clad material are necessary to achieve a desired cladding thickness.

For some superalloy materials in the zone of non-weldability there is no known commercially acceptable welding or repair process. Furthermore, as new and higher alloy content superalloys continue to be developed, the challenge to develop commercially feasible joining processes for superalloy materials continues to grow.

BRIEF DESCRIPTION OF THE DRAWINGS

The invention is explained in the following description in view of the drawings that show.

DETAILED DESCRIPTION OF THE INVENTION

It is noted for the convenience of the reader that FIGS. 1-5 and 7 herein illustrate various aspects and applications of the inventive technology described herein, and that the description of FIG. 8 below is particularly directed to the presently claimed use of the inventive technology for selective laser sintering and selective laser melting applications.

The present inventors have developed a materials joining process that can be used successfully to clad, join and repair the most difficult to weld superalloy materials. While flux materials have not previously been utilized when welding superalloy materials, embodiments of the inventive process advantageously apply a powdered flux material during a laser microcladding process. The powdered flux material is effective to provide beam energy trapping, impurity cleansing, atmospheric shielding, bead shaping, and cooling temperature control in order to accomplish crack-free joining of superalloy materials without the necessity for high temperature hot box welding or the use of a chill plate or the use of inert shielding gas. While various elements of the present invention have been known in the welding industry for decades, the present inventors have innovatively developed a combination of steps for a superalloy additive manufacturing process that overcome the long-standing limitations of known selective laser melting and sintering processes for these materials.

Figure 1:
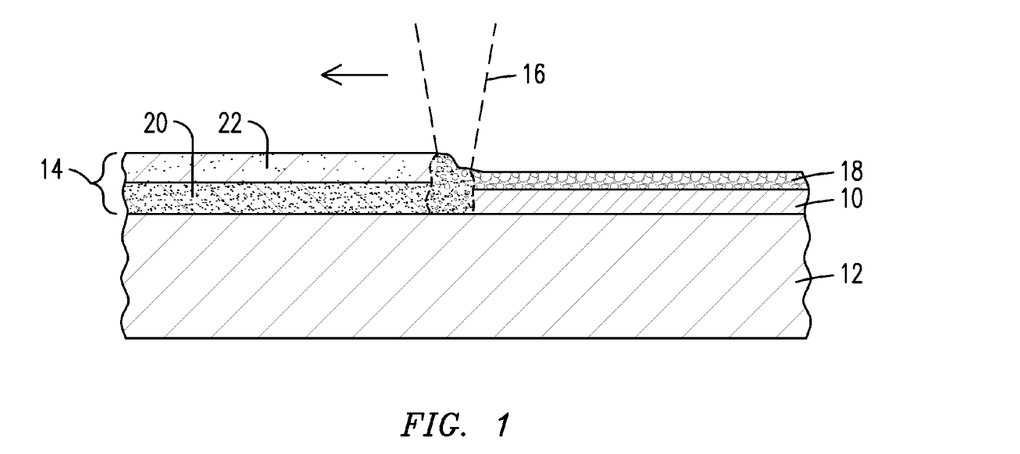
FIG. 1 illustrates a cladding process using a multi-layer powder.

FIG. 1 illustrates a process where a layer of cladding 10 of a superalloy material is being deposited onto a superalloy substrate material 12 at ambient room temperature without any preheating of the substrate material 12 or the use of a chill plate. The substrate material 12 may form part of a gas turbine engine blade, for example, and the cladding process may be part of a repair procedure in some embodiments. A layer of granulated powder 14 is pre-placed on the substrate 12, and a laser beam 16 is traversed across the layer of powder 14 to melt the powder and to form the layer of cladding 10 covered by a layer of slag 18. The cladding 10 and slag 18 are formed from the layer of powder 14 which includes a layer of powdered superalloy material 20 covered by a layer of powdered flux material 22.

The flux material 22 and resultant layer of slag 18 provide a number of functions that are beneficial for preventing cracking of the cladding 10 and the underlying substrate material 12. First, they function to shield both the region of molten material and the solidified (but still hot) cladding material 10 from the atmosphere in the region downstream of the laser beam 16. The slag floats to the surface to separate the molten or hot metal from the atmosphere, and the flux may be formulated to produce a shielding gas in some embodiments, thereby avoiding or minimizing the use of expensive inert gas. Second, the slag 18 acts as a blanket that allows the solidified material to cool slowly and evenly, thereby reducing residual stresses that can contribute to post weld reheat or strain age cracking. Third, the slag 18 helps to shape the pool of molten metal to keep it close to a desired 1/3 height/width ratio. Fourth, the flux material 22 provides a cleansing effect for removing trace impurities such as sulfur and phosphorous which contribute to weld solidification cracking. Such cleansing includes deoxidation of the metal powder. Because the flux powder is in intimate contact with the metal powder, it is especially effective in accomplishing this function. Finally, the flux material 22 may provide an energy absorption and trapping function to more effectively convert the laser beam 16 into heat energy, thus facilitating a precise control of heat input, such as within 1-2%, and a resultant tight control of material temperature during the process. Additionally, the flux may be formulated to compensate for loss of volatized elements during processing or to actively contribute elements to the deposit that are not otherwise provided by the metal powder itself. Together, these process steps produce crack-free deposits of superalloy cladding on superalloy substrates at room temperature for materials that heretofore were believed only to be joinable with a hot box process or through the use of a chill plate.

Figure 2:
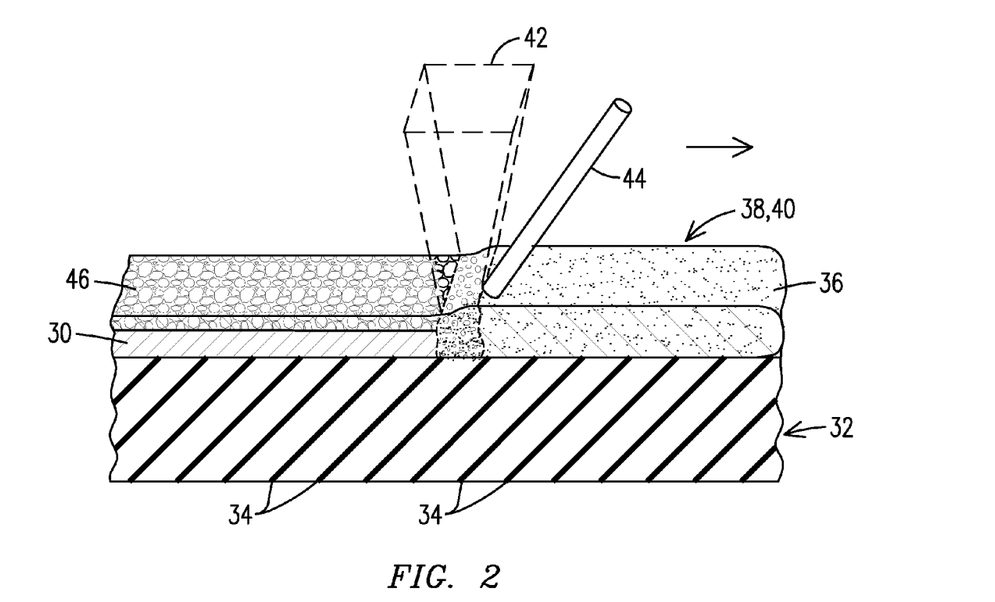
FIG. 2 illustrates a cladding process using a mixed layer powder.

FIG. 2 illustrates another embodiment where a layer of cladding 30 of a superalloy material is being deposited onto a superalloy substrate material 32, which in this embodiment is illustrated as a directionally solidified material having a plurality of columnar grains 34. In this embodiment, the layer of powder 36 is pre-placed or fed onto the surface of the substrate material 32 as a homogeneous layer including a mixture of both powdered alloy material 38 and powdered flux material 40. The layer of powder 36 may be one to several millimeters in thickness in some embodiments rather than the fraction of a millimeter typical with known selective laser melting and sintering processes. Typical powdered prior art flux materials have particle sizes ranging from 0.5-2 mm, for example. However, the powdered alloy material 38 may have a particle size range (mesh size range) of from 0.02-0.04 mm or 0.02-0.08 mm or other sub-range therein. This difference in mesh size range may work well in the embodiment of FIG. 1 where the materials constitute separate layers; however, in the embodiment of FIG. 2, it may be advantageous for the powdered alloy material 38 and the powdered flux material 40 to have overlapping mesh size ranges, or to have the same mesh size range in order to facilitate mixing and feeding of the powders and to provide improved flux coverage during the melting process.

The energy beam 42 in the embodiment of FIG. 2 is a diode laser beam having a generally rectangular cross-sectional shape, although other known types of energy beams may be used, such as electron beam, plasma beam, one or more circular laser beams, a scanned laser beam (scanned one, two or three dimensionally), an integrated laser beam, etc. The rectangular shape may be particularly advantageous for embodiments having a relatively large area to be clad, such as for repairing the tip of a gas turbine engine blade. The broad area beam produced by a diode laser helps to reduce weld heat input, heat affected zone, dilution from the substrate and residual stresses, all of which reduce the tendency for the cracking effects normally associated with superalloy repair. Optical conditions and hardware optics used to generate a broad area laser exposure may include but are not limited to: defocusing of the laser beam; use of diode lasers that generate rectangular energy sources at focus; use of integrating optics such as segmented mirrors to generate rectangular energy sources at focus; scanning (rastering) of the laser beam in one or more dimensions; and the use of focusing optics of variable beam diameter (e.g. 0.5 mm at focus for fine detailed work varied to 2.0 mm at focus for less detailed work). The motion of the optics and/or substrate may be programmed as in a selective laser melting or sintering process to build a custom shape layer deposit. Advantages of this process over known laser melting or sintering processes include: high deposition rates and thick deposit in each processing layer; improved shielding that extends over the hot deposited metal without the need for inert gas; flux will enhance cleansing of the deposit of constituents that otherwise lead to solidification cracking; flux will enhance laser beam absorption and minimize reflection back to processing equipment; slag formation will shape and support the deposit, preserve heat and slow the cooling rate, thereby reducing residual stresses that otherwise contribute to strain age (reheat) cracking during post weld heat treatments; flux may compensate for elemental losses or add alloying elements, and powder and flux pre-placement or feeding can efficiently be conducted selectively because the thickness of the deposit greatly reduces the time involved in total part building.

The embodiment of FIG. 2 also illustrates the use of a base alloy feed material 44. The feed material 44 may be in the form of a wire or strip that is fed or oscillated toward the substrate 32 and is melted by the energy beam 42 to contribute to the melt pool. If desired, the feed material may be preheated (e.g. electrically) to reduce overall energy required from the laser beam. While it is difficult or impossible to form some superalloy materials into wire or strip form, materials such as pure nickel or nickel-chromium or nickel-chromium-cobalt are readily available in those forms. In the embodiment of FIG. 2, the base alloy feed material 44, powdered alloy material 38 and powdered flux material 40 are advantageously selected such that the layer of cladding material 30 has the composition of a desired superalloy material. The filler material may be only an extrudable subset of elements of a composition of elements defining a desired superalloy material, and the powdered metal material includes elements that complement the elements in the filler material to complete the composition of elements defining the desired superalloy material. The filler material and the powdered metal material are combined in the melt pool to form the repaired surface of desired superalloy material 30. As in FIG. 1, the process produces a layer of slag 46 that protects, shapes and thermally insulates the layer of cladding material 30.

Figure 3:
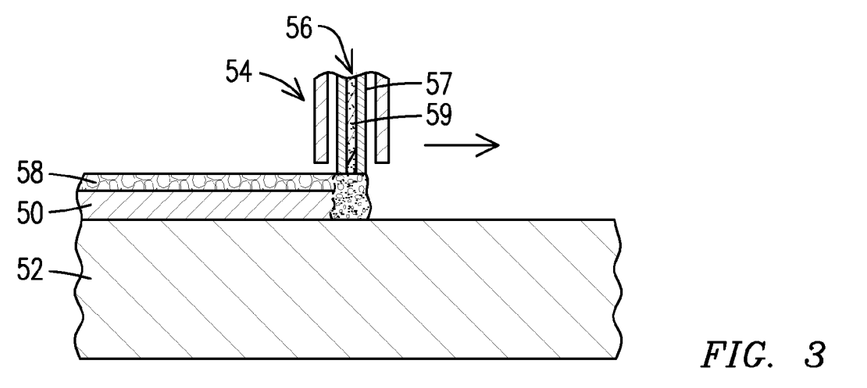
FIG. 3 illustrates a cladding process using a cored filler wire and a cold metal arc welding torch.

FIG. 3 illustrates an embodiment where a layer of superalloy material 50 is deposited onto a superalloy substrate 52 using a cold metal arc welding torch 54. The torch 54 is used to feed and to melt a filler material 56 having the form of a cored wire or strip material including a hollow metal sheath 57 filled with a powdered material 59. The powdered material 59 may include powdered metal alloy and/or flux materials. Advantageously, the metal sheath 57 is formed of a material that can be conveniently formed into a hollow shape, such as nickel or nickel-chromium or nickel-chromium-cobalt, and the powdered material 59 is selected such that a desired superalloy composition is formed when the filler material 56 is melted. The sheath contains sufficient nickel (or cobalt) to achieve the desired superalloy composition, thus the solid to solid ratio of sheath verses powdered core material may be maintained at a ratio of 3:2, for example. The heat of the arc melts the filler material 56 and forms a layer of the desired superalloy material 50 covered by a layer of slag 58. Powdered flux material may be provided in the filler material 56 (for example 25% of the core volume) or it may be pre-placed or deposited onto the surface of the substrate 52 (not shown—see FIG. 2), or both. In various embodiments, the flux may be electrically conductive (electroslag) or not (submerged arc), and it may be chemically neutral or additive. As before, the filler material may be preheated to reduce process energy required—in this case from the cold metal arc torch. The use of flux would provide shielding thereby reducing or eliminating the need for inert or partially inert gas commonly required in the cold metal arc process.

Figure 4:
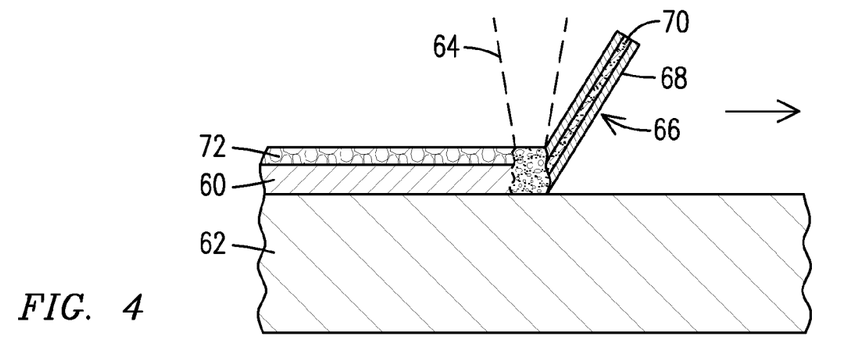
FIG. 4 illustrates a cladding process using a cored filler wire and an energy beam.

FIG. 4 illustrates an embodiment where a layer of superalloy material 60 is deposited onto a superalloy substrate 62 using an energy beam such as laser beam 64 to melt a filler material 66. As described above with respect to FIG. 3, the filler material 66 includes a metal sheath 68 that is constructed of a material that can be conveniently formed into a hollow shape, such as nickel or nickel-chromium or nickel-chromium-cobalt, and a powdered material 70 is selected such that a desired superalloy composition is formed when the filler material 66 is melted by the laser beam 64. The powdered material 70 may include powdered flux as well as alloying elements. The heat of the laser beam 64 melts the filler material 66 and forms a layer of the desired superalloy material 60 covered by a layer of slag 72. As before, the filler material may be preheated to reduce process energy required—in this case from the laser beam.

One embodiment of a filler material 56, 66 is formulated to deposit alloy 247 material as follows:
  sheath solid volume is about 60% of total metallic solid volume and is pure Ni;
  core metal powder volume is about 40% of total metallic solid volume including sufficient Cr, Co, Mo, W, Al, Ti, Ta, C, B, Zr and Hf; that when melted together and mixed with the pure nickel from the sheath, produces alloy 247 composition of nominal weight percent 8.3 Cr, 10 Co, 0.7 Mo, 10 W, 5.5 Al, 1 Ti, 3 Ta, 0.14 C, 0.015 B, 0.05 Zr and 1.5 Hf; and
  core flux powder volume represents additional, largely non-metallic, wire volume possibly about equal in size to the metal powder volume and includes alumina, fluorides and silicates in a 35/30/35 ratio. The mesh size range of the flux is such as to distribute uniformly within the core metal powder.

For embodiments where the heat of melting is provided by an arc, it is common to provide carbon dioxide in the flux or shielding gas in order to maintain arc stability. However, the carbon dioxide will react with titanium and some of the titanium will be lost as vapor or oxides during the melting process. The present process allows the amount of titanium included in the filler material to be in excess of the amount of titanium desired in the deposited superalloy composition to compensate for this loss. For the example of alloy 247 described above, the amount of titanium included in the core metal powder may be increased from 1% to 3%.

Repair processes for superalloy materials in accordance with the processes described herein may include preparing the superalloy material surface to be repaired by grinding as desired to remove defects, cleaning the surface, then pre-placing or feeding a layer of powdered material containing flux material onto the surface, then traversing an energy beam across the surface to melt the powder and an upper layer of the surface into a melt pool having a floating slag layer, then allowing the melt pool and slag to solidify. The melting functions to heal any surface defects at the surface of the substrate, leaving a renewed surface upon removal of the slag typically by known mechanical and/or chemical processes. The powdered material may be only flux material, or for embodiments where a layer of superalloy cladding material is desired, the powdered material may contain metal powder, either as a separate layer placed under a layer of powdered flux material, or mixed with the powdered flux material, or combined with the flux material into composite particles, such that the melting forms the layer of cladding material on the surface. Optionally, a feed material may be introduced into the melt pool in the form of a strip or wire. The powdered metal and feed material (if any), as well as any metal contribution from the flux material which may be neutral or additive, are combined in the melt pool to produce a cladding layer having the composition of a desired superalloy material. In some embodiments, a feed material of nickel, nickel-chromium, nickel-chromium-cobalt or other conveniently extruded metal is combined with appropriate alloying metal powders to produce the desired superalloy composition in the cladding, thereby avoiding the problem of forming the desired superalloy material into a wire or strip form.

While pre-heating of the substrate is not necessarily required to obtain acceptable results, it may be desired to apply heat to the superalloy substrate and/or to the feed material and/or the powder prior to the melting step in some embodiments, such as to increase the ductility of the substrate material and/or to reduce beam energy otherwise required to melt the filler. Ductility improvement of some superalloy substrates is achieved at temperatures above about 80% of the alloy's melting point. Similarly, a chill fixture could optionally be used for particular applications, which in combination with the precision heat input of an energy beam can minimize stresses created in the material as a result of the melting process. Furthermore, the present invention negates the need for an inert shielding gas, although supplemental shielding gas may be used in some applications if preferred. If a filler material 44 is used, it may be pre-heated in some embodiments.

Flux materials which could be used include commercially available fluxes such as those sold under the names Lincolnweld P2007, Bohler Soudokay NiCrW-412, ESAB OK 10.16 or 10.90, Special Metals NT100, Oerlikon OP76, Sandvik 50SW or SAS1. The flux particles may be ground to a desired smaller mesh size range before use. Any of the currently available iron, nickel or cobalt based superalloys that are routinely used for high temperature applications such as gas turbine engines may be joined, repaired or coated with the inventive process, including those alloys mentioned above.

Other variations may provide the heat for melting through the feed material rather than or in combination with an energy beam. For example, the wire or strip feed material 44 of FIG. 2 may be energized to create an arc under the layer of powder and flux, with the wire being a material that is readily available in extruded form (i.e. not a superalloy material) and the powder including the other alloying elements necessary to form a desired superalloy composition in the combined melt pool. Alternatively, the powder and flux may be selected to be conductive such as to facilitate an electro-slag welding process effective to form the layer of superalloy cladding material. In yet another embodiment, flux powder mixed with superalloy powder material may be fed to a superalloy substrate using conventional plasma arc cladding equipment, optionally with a chill fixture. The substrate, feed material and/or powder may be preheated in various embodiments. Because the degree of precision of the heat input is higher with the energy beam (±1-2%) than with an electrode (±10-15%), it may be desirable to utilize the energy beam for more than half of the total heat input. The beam energy may lead the submerged arc or electroslag process to initiate a preliminary melt pool with minimum dilution from the substrate, then the submerged arc or electroslag contribution can add to the volume of deposit without significant further substrate impact, thereby minimizing dilution effects.

In accordance with various embodiments, mixed submerged arc welding flux and alloy 247 powder was pre-placed from 2.5 to 5.5 mm depths and demonstrated to achieve crack free laser clad deposits after final post weld heat treatment. Ytterbium fiber laser power levels from 0.6 up to 2 kilowatts have been used with galvanometer scanning optics making melt pool deposits from 3 to 10 mm in width at travel speeds on the order of 125 mm/min. Absence of cracking has been confirmed by dye penetrant testing and metallographic examination of deposit cross sections. It will be appreciated that alloy 247 is among the most difficult to weld of known superalloys, as illustrated in FIG. 6, thereby demonstrating the operability of the invention for a full range of superalloy compositions, including those with aluminum content of greater than 3 wt. %.

It is appreciated that the advantages of utilizing powdered flux material when repairing a superalloy substrate are realized whether or not an additive cladding material is deposited. Surface cracks in a superalloy substrate may be repaired by covering the surface with powdered flux material, then heating the surface and the flux material to form a melt pool with a floating slag layer. Upon solidification of the melt pool under the protection of the slag layer, a clean surface with no cracks will be formed.

Figure 5:
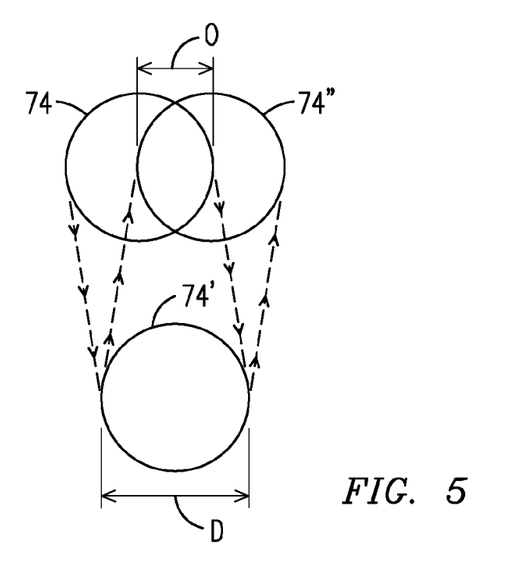
FIG. 5 illustrates an energy beam overlap pattern.

Laser energy may be applied across a surface area by using a diode laser having a generally rectangular energy density. Alternatively, it is possible to raster a circular laser beam back and forth as it is moved forward along a substrate to effect an area energy distribution. FIG. 5 illustrates a rastering pattern for one embodiment where a generally circular beam having a spot diameter D is moved from a first position 74 to a second position 74' and then to a third position 74" and so on. An amount of overlap O of the beam diameter pattern at its locations of a change of direction is preferably between 25-90% of D in order to provide optimal heating and melting of the materials. Alternatively, two energy beams may be rastered concurrently to achieve a desired energy distribution across a surface area, with the overlap between the beam patterns being in the range of 25-90% of the diameters of the respective beams.

Figure 7:
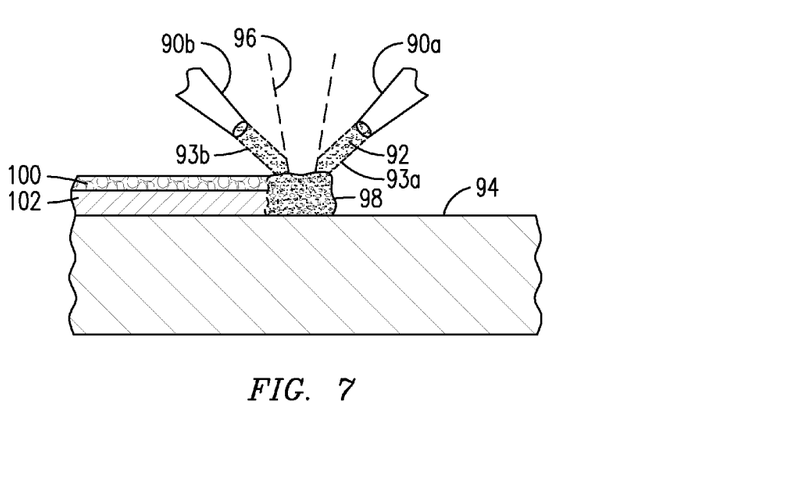
FIG. 7 illustrates the application of superalloy cladding by a laser microcladding process utilizing powdered flux material.

FIG. 7 illustrates a laser microcladding process utilizing a powdered flux material. One or more nozzles 90a, 90b are used to direct a jet 92 containing a propellant gas and powdered material toward a substrate 94. The substrate may or may not be a superalloy material, but advantageously may be a material located beyond the zone of weldability delimited by line 80 of FIG. 6. The powdered material in the jet 92 may include any alloy material 93a that needs to be protected from air when melted, and advantageously may contain a powdered alloy material located beyond the zone of weldability delimited by line 80 of FIG. 6. As the powdered material is propelled toward the surface of the substrate 94, it is melted by an energy beam such as laser beam 96 to form a weld pool 98. The powdered material also includes powdered flux material 93b which melts together with the powdered alloy material 93a and then separates and solidifies to form a layer 100 of slag over a layer of clad alloy material 102 as the process is traversed across the surface of the substrate 94. The slag 100 is removed after the materials have cooled using any known process. The powdered flux material 93b provides all of the advantages attributed to it in the processes of FIGS. 1-4 above. Moreover, because the powdered flux material 93b provides a shielding and deoxidizing effect at the point of processing, i.e. within the weld pool itself, the propellant gas may be a traditional inert gas such as argon, or it may be less expensive nitrogen or air.

As described with regard to FIGS. 1-4 above, the powdered flux 93b and powdered alloy material 93a in the jet 92 may have overlapping mesh size ranges or may be formed as a composite particle. Because no pre-placing of powder is required, the process of FIG. 7 may be applied to non-horizontal surface, and further may be used in conjunction with a multi-axis tool to apply cladding to three dimensional surfaces such as along an inside surface of a gas turbine combustor transition cone. In one embodiment, the process of FIG. 7 may be used to apply a hard facing or stainless steel anti-corrosion material for marine applications. The flux 93b and alloy 93a may be fed from the same nozzle or may be fed independently from separate nozzles 90b, 90a.

The process of FIG. 7 overcomes the limitations of traditional laser microcladding for the deposition of superalloy materials because higher deposition rates (such as double the deposition rate without flux addition) are achievable without cracking using standard post weld heat treatments. A laser diode or rastering of a laser beam, as illustrated by FIG. 5, may facilitate such high deposition rates.

Figure 8:
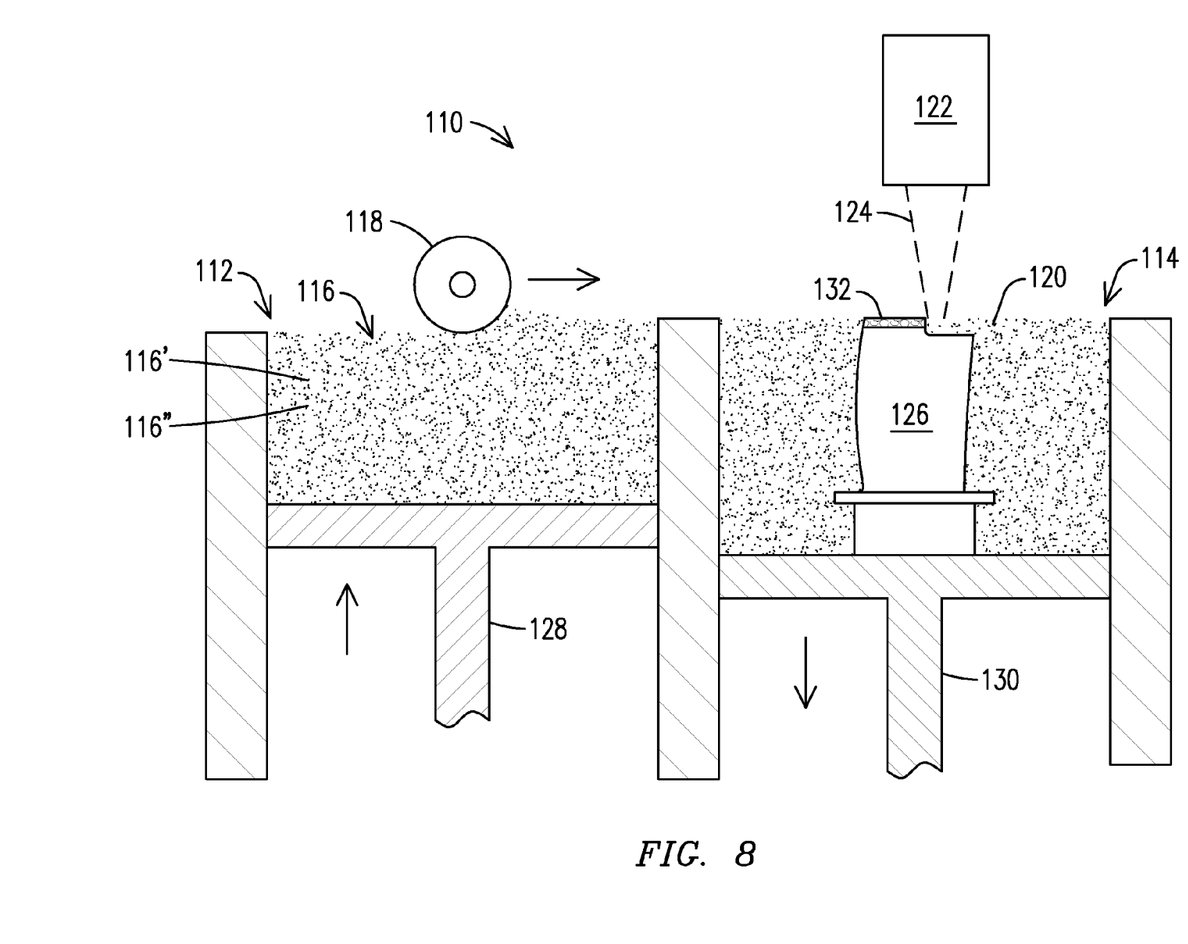
FIG. 8 is a schematic illustration of an additive manufacturing process in accordance with an embodiment of the invention.

FIG. 8 illustrates an additive manufacturing process such as selective laser sintering or selective laser melting, collectively referred to herein as selective laser heating, in accordance with an embodiment of the invention. An additive manufacturing apparatus 110 includes a powder feed portion 112 and a fabrication portion 114. The powder feed portion 112 contains a volume of powder 116 which is selectively moved to the fabrication portion 114 by a powder feed and distribution device such as roller 118, which delivers a predetermined thickness of unprocessed powder 116 across the top surface of a fabrication powder bed 120 of the fabrication portion 114. A scanning system 122 then selectively scans an energy beam such as laser beam 124 in a programmed pattern across portions of the surface of the fabrication powder bed 120 to selectively heat (melt, partially melt or sinter) and solidify a region of the powder to form a portion of component 126. A delivery piston 128 then moves upward to make additional powder 116 available to the roller 118, a fabrication piston 130 moves downward to allow the fabrication powder bed 120 to receive another layer of powder 116, and the process is repeated with a pattern of indexing of the laser beam 124 effective to form a desired component shape.

With prior art selective laser heating processes involving superalloy materials, powdered superalloy material is heated under an inert cover gas in order to protect the melted or partially melted powder 116 from contact with air. In contrast, the embodiment of the present invention illustrated in FIG. 8 utilizes powdered superalloy material 116' plus powdered flux 116" as the powder 116, and thus the heating need not be (although it may optionally be) performed under an inert cover gas because melted flux provides the necessary shielding from air. The powder 116 may be a mixture of powdered alloy 116' and powdered flux 116", or it may be composite particles of alloy and flux, as described above. In order to enhance the precision of the process, the powder 116 may be of a fine mesh, for example 20 to 100 microns, and the mesh size range of flux particles 116" may overlap or be the same as the mesh size range of the alloy particles 116'. The small size of such particles results in a large surface area per unit volume, and thus a large potential for problematic oxides formed on the alloy particle surface. Composite particles may minimize this problem by coating alloy particles with flux material. Furthermore, the melted flux will provide a cleaning action to reduce melt defects by forming shielding gas and by reacting with oxides and other contaminants and floating them to the surface where they form a readily removed slag 132. The slag 132 is removed from each melt layer before the next layer of powder 116 is moved into the fabrication powder bed 120. One apparatus for removing slag is described in concurrently filed U.S. patent application Ser. No. 13/755,157, incorporated by reference herein.

The flux 116" functions as a light trap to assist in the absorption of laser energy, and the resulting slag 132 slows the cooling rate and contains process energy. The flux 116" may be formulated to contribute to the deposit chemistry in some embodiments. While not required, it may be advantageous to heat the powder 116 and/or the component 126 prior to a heating step. Post process hot isostatic pressing is also not required by may be used in some embodiments. Post weld heat treatment of the completed component 126 may be performed with a low risk of reheat cracking even for superalloys that are outside the zone of weldability as discussed above with regard to FIG. 6.

The process illustrated in FIG. 8 may be useful for original equipment manufacturing or for rapid prototyping of parts. Furthermore, the process may be used for component repair applications, such as for forming a replacement blade tip on a gas turbine blade that has been removed from service for refurbishing. The present invention eliminates the need for inert cover gas, provides precise laser processing for tight tolerance control, provides a solution to the long-standing problem of oxides on fine superalloy powder used in selective laser heating processes, and allows for the crack-free deposition of superalloys having compositions beyond the previously known zone of weldability.

It will be appreciated that the use of powdered material facilitates the deposition of functionally graded materials, where the composition of the deposited material varies across time and space. For example, if the component 126 of FIG. 8 is a gas turbine vane, a platform portion of the vane may be a first composition and an airfoil portion of the vane may be a second, different composition. In other embodiments the alloy composition may vary from an interior wall to an exterior wall of a product, or from within a product to near it's surfaces. The alloy composition may be varied in response to anticipated operating conditions requiring different mechanical or corrosion resistance properties, and with consideration of the cost of the materials.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A process comprising:
   placing a first layer of powder comprising alloy material and flux material on a surface;
   indexing an energy beam across the first layer of powder to selectively melt a region of alloy under an overlying layer of slag;
   allowing the alloy and slag to solidify;
   removing the slag; and
   repeating the placing, indexing and removing steps with a pattern of indexing effective to form a desired component shape;
   wherein the alloy material comprises a superalloy composition beyond a zone of weldability defined on a graph of superalloys plotting titanium content verses aluminum content, wherein the zone of weldability is upper bounded by a line intersecting the titanium content axis at 6 wt. % and intersecting the aluminum content axis at 3 wt. %; and wherein the process is performed at an ambient room temperature without preheating the surface, and the slag acts as a blanket that causes the region of alloy to cool slowly and evenly.

2. The process of claim 1, further comprising forming the layer of powder as a mixed layer of alloy particles and flux particles wherein a mesh size range of the alloy particles and a mesh size range of the flux particles overlap.

3. The process of claim 1, further comprising forming the layer of powder as a layer of composite alloy and flux particles comprising particles of the alloy material coated with the flux material.

4. The process of claim 1, further comprising post weld heat treating the component shape without inducing reheat cracking.

5. The process of claim 1 performed without providing a protective cover of inert gas.

6. The process of claim 1, wherein the flux material is formulated to contribute to a deposit chemistry of the solidified region of alloy.

7. The process of claim 1, wherein the energy beam is a laser beam, and the flux material provides an energy absorption and trapping function that converts the laser beam into heat energy and facilitates control of heat input within 1-2%.

8. An additive manufacturing process wherein the improvement comprises:

selectively heating respective regions of successive layers of powder comprising alloy material and flux material to form molten and solidified regions of alloy covered by molten and solidified slag; and removing the solidified slag before heating each next successive layer;

wherein the alloy material comprises a superalloy composition beyond a zone of weldability defined on a graph of superalloys plotting titanium content verses aluminum content, wherein the zone of weldability is upper bounded by a line intersecting the titanium content axis at 6 wt. % and intersecting the aluminum content axis at 3 wt. %; and wherein the process is performed without providing a protective cover of inert gas, and the slag shields the molten and solidified regions of alloy from the atmosphere.

9. The process of claim 8, wherein the layer of powder comprises mixed alloy particles and flux particles wherein a mesh size range of the alloy particles and a mesh size range of the flux particles overlap.

10. The process of claim 8, wherein the layer of powder is a layer of composite alloy and flux particles comprising particles of the alloy material coated with the flux material.

11. The process of claim 8, further comprising:

repeating the heating and removing steps to form a desired component shape; and post weld heat treating the component shape without inducing reheat cracking.

12. The process of claim 8, wherein the flux material is formulated to contribute to a deposit chemistry of the solidified regions of alloy.

13. The process of claim 8, wherein the energy beam is a laser beam, and the flux material provides an energy absorption and trapping function that converts the laser beam into heat energy and facilitates control of heat input within 1-2%.

14. A process comprising:

forming a powder comprising a superalloy material and a flux material;

using the powder in an additive manufacturing process to form a desired component shape in a sequence of layers; and removing slag from each layer before forming the next layer;

wherein the alloy material comprises a superalloy composition beyond a zone of weldability defined on a graph of superalloys plotting titanium content verses aluminum content, wherein the zone of weldability is upper bounded by a line intersecting the titanium content axis at 6 wt. % and intersecting the aluminum content axis at 3 wt. %;

wherein the slag provides a heat blanket that controls the heat input, and the flux is formulated to produce a shielding gas, wherein the process is performed without the use of an inert gas flow, hot box, or chill plate.

15. The process of claim 14, further comprising forming the powder to comprise particles of the superalloy material coated with the flux material.

* * * * *